United States Patent [19]

Leczycki

[11] 4,025,093

[45] May 24, 1977

[54] PIPE COUPLINGS AND SPLIT RINGS USED THEREIN

[75] Inventor: Moshe Leczycki, Tel Aviv, Israel

[73] Assignee: Plasson Maagan Michael Industries Limited, Menashe, Israel

[22] Filed: Sept. 30, 1975

[21] Appl. No.: 618,281

[30] Foreign Application Priority Data

July 4, 1975  Israel ................... 47642

[52] U.S. Cl. ............................. 285/343; 285/348; 285/354; 285/382.7
[51] Int. Cl.² .......................................... F16L 21/04
[58] Field of Search .......... 285/343, 249, 323, 423, 285/146, 382.7, 316, 317, 348, 354

[56] References Cited

UNITED STATES PATENTS

| | | | |
|---|---|---|---|
| 2,120,275 | 6/1938 | Cowles | 285/323 X |
| 2,452,278 | 10/1948 | Woodling | 285/343 |
| 2,453,813 | 11/1948 | Prince | 285/343 X |
| 2,513,115 | 6/1950 | Sprigg | 285/249 |
| 2,683,047 | 7/1954 | Allen | 285/146 |
| 2,727,761 | 12/1955 | Elliott et al. | 285/316 X |
| 2,848,256 | 8/1958 | Tyler | 285/317 |
| 3,563,575 | 2/1971 | Sanford | 285/343 X |
| 3,815,940 | 6/1974 | Luckenbill | 285/323 X |
| 3,888,523 | 6/1975 | Bartholomew | 285/423 X |

FOREIGN PATENTS OR APPLICATIONS

| | | | |
|---|---|---|---|
| 270,545 | 9/1963 | Australia | 285/249 |
| 624,229 | 8/1961 | Italy | 285/343 |
| 1,049,299 | 11/1966 | United Kingdom | 285/343 |

Primary Examiner—Thomas F. Callaghan
Attorney, Agent, or Firm—Benjamin J. Barish

[57] ABSTRACT

A split-ring for use in a pipe coupling comprises an outer conical surface defined by the top lands of a plurality of spaced axially-extending ribs formed on its outer surface. Also described is a pipe coupling comprising a housing for receiving one end of the pipe, the split-ring, and a sleeve formed with an internal conical surface engagable with the outer conical ribs of the split ring to cause the ring to tightly clamp the pipe within the housing. In one described embodiment, the split-ring is constituted of a single unit formed with an axially-extending slit; and in a second described embodiment, it is constituted of two hinged sections.

5 Claims, 4 Drawing Figures

PIPE COUPLINGS AND SPLIT RINGS USED THEREIN

BACKGROUND OF THE INVENTION

The present invention relates to pipe couplings such as are used for coupling plastic pipes, and also to split-rings used in such couplings.

Pipe coupling of the split-ring type have gained widespread use particularly for coupling plastic pipes. These couplings generally include three main parts, namely: a housing formed with external threads and with an internal axial bore for receiving one end of the pipe; a split-ring having an outer conical surface for application around the pipe received in the bore of the housing; and a sleeve formed at one end with threads cooperable with the threads of the housing, and formed at the opposite end with an internal conical surface engagable with the outer conical surface of the split-ring to cause the split-ring to tightly clamp the pipe upon threading the sleeve onto the housing.

This type of coupling, of which many variations have been devised, has found extensive use but nevertheless they are not entirely satisfactory in a number of respects as will be described more particularly below. An object of the present invention is therefore to provide an improved pipe-coupling of the type described, and particularly an improved split-ring for use in such couplings.

SUMMARY OF THE INVENTION

According to the present invention, there is provided a pipe coupling comprising a housing formed with external threads and with an internal axial bore for receiving one end of a pipe, and a one-piece split-ring of hard elastic material for application around the pipe to be received in the bore of the housing, the split-ring having an outer tapered surface and an inner surface formed with annular teeth. The coupling further includes a sleeve formed at one end with threads cooperable with the threads of the housing and formed at the opposite end with an internal conical surface engageable with the outer tapered surface of the split-ring to cause the split-ring to tightly clamp the pipe upon threading the sleeve on the housing. An important feature of the present invention is that the split-ring has sufficiently axial elasticity to enable it to be opened widely along the slit and to be applied in a radial direction to the pipe after the latter has been inserted into the bore of the housing. For this purpose, the split-ring is constituted of a wall having the axially-extending slit and a plurality of circumferentially-spaced, axially-extending ribs of increasing height, the circumferential spacing between adjacent ribs being greater than the width of the ribs, and the outer tapered surface of the split-ring being defined by the top lands of the ribs.

This aspect of the invention provides a number of advantages. One important advantage is that it overcomes the difficulty, heretofore experienced with large-diameter pipe couplings of this type, in attaching the coupling to the pipe. Such coupling use sealing rings which impose a great resistance, particularly in large diameter pipes, to the manual insertion of the pipe into the housing bore. In the present invention, a substantially increased axial elasticity is produced in the split-ring because of the novel structure defined, which enables the split-ring to be applied to the pipe after it has been inserted into the housing bore and therefore greatly simplifies the manual insertion of the pipe into the bore. This will be described more particularly below with respect to a preferred embodiment of the coupling as illustrated in the drawings.

Another advantage provided by the above-defined split-ring structure is that a better clamping effect is provided by the split-ring with respect to the pipe, since the radial pressure produced by tightening the threaded sleeve into the housing is localized and concentrated along pressure lines, namely the lines defined by the ribs, rather than being distributed over the entire surface of the split-ring. A further advantage is that the upper face or top lands of the ribs tend to wedge against the conical surface of the threaded sleeve, thereby better securing the threaded sleeve to the split-ring against rotation. A still further advantage is that less material is required for the split-ring than for the conventional design, considering the requirements for any particular application, and therefore the overall coupling cost is significantly reduced.

According to further aspects, the invention provides the novel split-rings per se for use in pipe couplings of the type described.

Still further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENTS

Figures 1, 4:
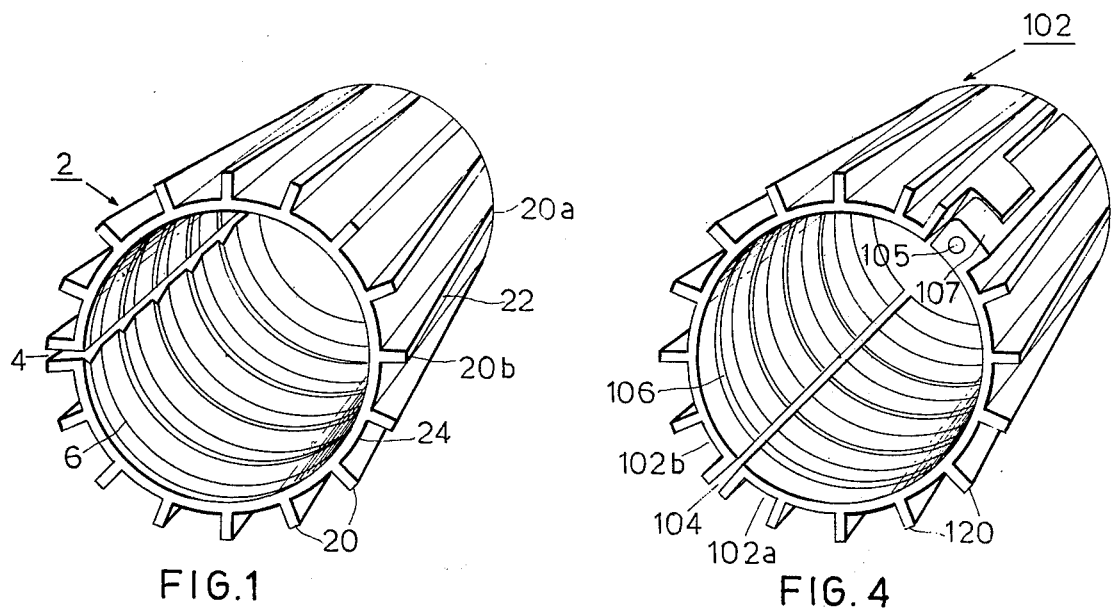
FIG. 1 is a perspective view of a split-ring constructed in accordance with one aspect of the invention for use in pipe couplings of the type described.
FIG. 4 illustrates a second type of split-ring which may be used in accordance with the invention.

With reference first to FIG. 1, the split-ring illustrated is generally designated 2 and is formed of a single unit of hard elastic material, such as a polyacetal resin, having an axially-extending slit 4 parallel to the longitudinal axis of the ring. As shown, the inner face of split-ring 2 is the pipe to be clamped by the coupling, and the outer face of the split-ring is formed with a conical surface cooperable with the internal conical surface of the coupling sleeve threaded onto the coupling housing.

Figure 2:
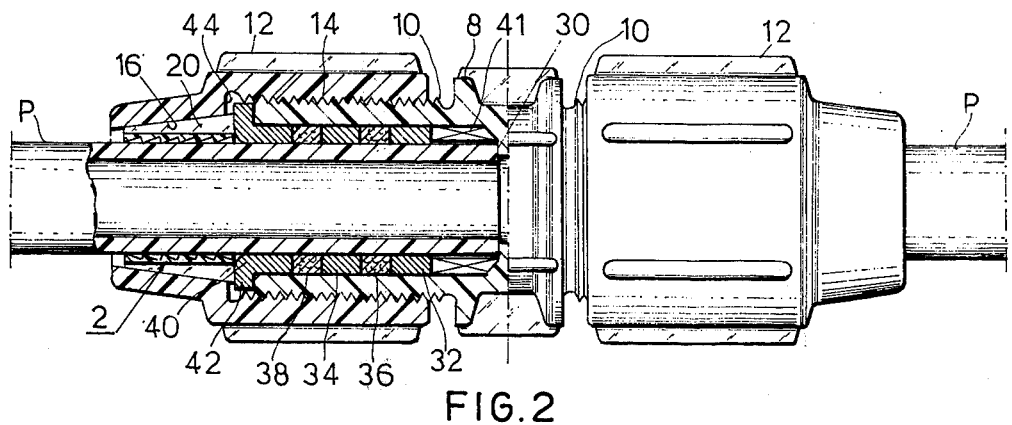
FIG. 2 is a side elevational view, partly in section, of an in-line pipe coupling including the split-ring of FIG. 1.

FIG. 2 illustrates the essential parts of the coupling assembled to the pipe P, these parts including the split-ring 2 of FIG. 1, the coupling housing 8 formed with external theads 10, and the coupling sleeve 12 formed with internal threads 14 at one end cooperable with threads 10 of the housing, and formed at the opposite end with an internal conical surface 16 engageable with the outer conical surface of the split-ring to cause the split-ring to tightly clamp the pipe P upon threading the sleeve into the housing.

According to one aspect of the invention, the split-ring 2 is formed on its outer surface with a plurality of circumferentially-spaced, axially-extending ribs 20, the height of the ribs uniformly increasing from one end 20a to the opposite end 20b. This arrangement produces an outer conical surface to the split-ring which conical surface is defined by the top lands or surfaces 22 of the ribs 20. The bottom lands 24 of the ribs, namely the circumferential spacings between adjacent ribs, are substantially greater than the width of the ribs and are substantially parallel to the longitudinal axis of the split ring.

Such a construction substantially increases the elasticity of the split-ring which facilitates the attachment of the coupling to a pipe, and provides a number of additional advantages, all as described more fully below.

The complete coupling illustrated in FIG. 2 is an in-line type for coupling two pipes P together. Accordingly, the coupling housing 8 is formed with two in-line axial bores separated by an internal shoulder 30, each bore receiving one of the pipes P and the other elements of the coupling for clamping same within the housing bore.

Thus, with respect to the left end of the coupling illustrated in FIG. 2, the coupling includes the previously mentioned split-ring 2 (of FIG. 1), and the sleeve 12 threadedly received at one end on housing 8 and formed at the opposite end with the internal conical surface 16 engaging the split-ring 2. In addition, the coupling includes a pair of annular spacer rings 32 and 34, a pair of sealing rings 36 and 38, and an end bushing 40. In the assembled condition of the coupling on the pipe as shown in FIG. 2, the inner spacer ring 32 abuts against the end of a plurality of axially-extending ribs 41 formed within the bore of the housing adjacent to its internal shoulder 30. Next appear sealing ring 36, spacer ring 34, sealing ring 38, and finally the annular bushing 40 against sealing ring 38. Bushing 40 is formed with an out-turned rim 42, the outer face of which is engaged by the split-ring 2 to firmly press the inner face of the bushing against the end face of housing 8.

In addition, sleeve 12 is formed with an internal step or shoulder 44, for a purpose to be described below, between its threaded portion 14 and its conical portion 16.

As briefly described earlier, considerable difficulty is experienced with respect to the existing couplings of the type described, particularly with large-diameter pipes, in manually inserting the pipe into the axial bore formed within the coupling housing 8. Because of the relative inelasticity of the split-rings used in the existing couplings, the normal procedure for attaching the coupling to the pipe is first to pass the end of the pipe through the split-ring (the smaller diameter of the split-ring facing inwardly), and then to pass the end of the pipe into the housing bore until the pipe end abuts the internal shoulder (e.g., 30) of the bore. The sealing rings in some cases are disposed within the housing bore in annular recesses formed therein, and in other cases are applied to the end of the pipe inserted into the bore. In either case, however, the sealing ring imposes a considerable resistance to the manual insertion of the pipe to the bore end, this being particularly true with respect to large-diameter pipes, for example in the order of 110 mm.

One of the important advantages in the novel construction of the split-ring 2 illustrated in FIG. 1 is that, because of its substantially increased elasticity, it greatly facilitates the manual insertion of the pipe into the housing bore, by the following procedure:

First, the end of pipe P is passed through sleeve 12, bushing 40, sealing ring 38, spacer ring 34, sealing ring 36, and spacer ring 32, in the order as illustrated in FIG. 2, except that the split-ring 2 is not applied to the pipe at this stage. The end of the pipe is then inserted into the open end of the bore within housing 8, and sleeve 12 is tightened, by its threads 14 engaging threads 10 of the housing, to move the pipe with the above elements assembled thereon into the housing bore. During this tightning of sleeve 12, its internal shoulder 44 engages the outer face of the out-turned rim 42 of bushing 40, pressing it, as well as the end of the pipe and the other elements thereon, inwardly of the housing bore until the end spacer ring 32 firmly abuts against the internal ribs 41 of the housing. Then sleeve 12 is un-threaded and removed from the housing, split-ring 2 is spread apart (this being permitted by the highly elastic structure of the split-ring as illustrated in FIG. 1) until it snaps into place around the pipe, and then the sleeve 12 is threaded back onto housing 8 to bring the conical surface 16 of the sleeve against the outer conical face (defined by the top lands 20b of ribs 20 as described above) until the end of the split-ring firmly abuts and presses against the out-turned rim 42 of bushing 40 with the teeth 6 on the inner face of the split-ring biting into the pipe P.

In other words, whereas in the existing pipe couplings of the type described the split-ring is first applied axially through the end of the pipe and then the pipe and split-ring are inserted together into the housing (this procedure being required because of the relatively low elasticity of the split-ring), in the present invention the split-ring (because of its highly elastic construction) may be applied radially to the pipe after the latter has already been inserted into the housing bore with the aid of the threaded sleeve 12 and the mechanical advantage provided thereby.

Another advantage of the novel split-ring construction illustrated in FIG. 1 is that the radial pressure applied to the split-ring via the conical face 16 of the threaded sleeve 12 is localized and concentrated along the lines of the ribs 20, rather than being distributed over the entire surface of the split ring. These concentrated localized forces produce a better biting effect by the teeth 6 formed on the inner face of the split-ring, thereby more securely clamping the pipe within the coupling against large pull-out forces.

A further advantage is that the ribs 20 also tend to produce a wedging effect with respect to the conical surface 16 of the threaded sleeve 12, thereby more securely holding the threaded sleeve on the split-ring against forces which might tend to unthread the sleeve. A still further advantage of the novel split-ring construction is that it enables a minimum amount of material to be used for the split-ring, considering the requirements of any particular application, thereby reducing the material cost and moulding time in the production of the split-rings.

Figure 3:
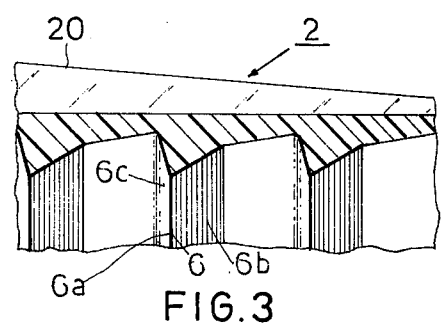
FIG. 3 is an enlarged sectional view illustrating the configuration of the internal teeth formed in the split-ring of FIG. 1.

FIG. 3 illustrates an improved structure for the internal teeth 6 which provides a better biting edge with respect to the pipe P. As shown in FIG. 3, the annular teeth 6 are provided with pointed edges 6a defined by a first face 6b at a large angle, preferably about 60°, to the transverse axis of the split-ring, and a second face 6c at a much smaller angle, preferably about 15°, to the transverse axis of the split-ring. This configuration has been found to minimize the deformation of the teeth when stripping the split-ring from the mold in which it is produced and also has been found to strengthen the teeth during use.

FIG. 4 illustrates a variation in the split-ring described above. Whereas the split-ring 2 illustrated in FIG. 1 is constituted of a single unit having an axially-extending split 4, the split-ring 102 illustrated in FIG. 4 is constituted of two separate sections 102a and 102b hingedly connected together along one edge of each section. This hinged connection is illustrated in FIG. 4 by means of a pin 105 passing through apertured embossments 107 formed on the respective end of each of the two sections 102a and 102b. The opposite edges of the two sections constitute the split 104 comparable to the split 4 in FIG. 1. The split-ring 102 in FIG. 4 is otherwise substantially the same as described above with respect to FIG. 1, including the external ribs 120 comparable to ribs 20 in FIG. 1, and the internal teeth 106 comparable to teeth 6 in FIGS. 1 and 3.

The split-ring illustrated in FIG. 4 is used and is applied in the same manner as described above particularly with respect to the overall coupling construction of FIG. 2, since its hinged construction enables it likewise to be opened and applied radially to the pipe after the pipe has already been inserted into the bore of the coupling housing. The split-ring of FIG. 4 is particularly useful with very large-diameter couplings requiring even more elasticity in the split-ring than the construction of FIG. 1 to enable the radial application of the split-ring to the pipe after the pipe has already been introduced into the coupling housing with the aid of the threaded sleeve.

It will be appreciated that many modifications and variations can be made. For example, the axially-extending ribs (20 or 120) formed on the outer face of the split-ring may extend for the complete length of the split-ring, as shown both in FIGS. 1 and 4, or they may extend for only a part of the length. Further, the multi-section ring could include three or more sections, rather than the two illustrated in FIG. 4. In addition, the split-ring may be used in other coupling applications, that is those not including the bushings 40 or spacers 32, 34, or those using only one sealing ring.

Many other variations, modifications, and applications of the illustrated embodiments will be apparent.

What is claimed is:

1. A pipe coupling comprising a housing formed with external threads and with an internal axial bore for receiving one end of a pipe; a one-piece split-ring of hard elastic material for application around the pipe to be received in the bore of the housing, said split-ring having an outer tapered surface and an inner surface formed with annular teeth; and a sleeve formed at one end with threads cooperable with the threads of the housing, and formed at the opposite end with an internal conical surface engageable with the outer tapered surface of the split-ring to cause the split-ring to tightly clamp the pipe upon threading the sleeve onto the housing; characterized in that said split-ring has sufficient axial elasticity to enable it to be opened sufficiently wide along the slit and to be applied in a radial direction to the pipe after the latter has been inserted into the bore of the housing, said split-ring being constituted of a wall having an axially-extending slit and a plurality of circumferentially-spaced, axially-extending ribs of increasing height, the circumferential spacing between adjacent ribs being greater than the width of the ribs, the outer tapered surface of the split-ring being defined by the top lands of said ribs.

2. A coupling according to claim 1, wherein said top lands of the ribs form an angle of about 8° with respect to the longitudinal axis of the split-ring.

3. A coupling according to claim 1, wherein said annular teeth formed on the inner surface of the split-ring have pointed edges each defined by a first face formed at an angle of about 60° to the transverse axis of the split-ring, and a second face formed at an angle of about 15° to the transverse axis of the split-ring.

4. A coupling according to claim 1, wherein said housing is formed with an internal annular shoulder, the pipe coupling further including at least one annular spacer ring adapted to engage said internal annular shoulder, an end bushing having an out-turned rim adapted to abut the end of the housing and to be engaged by the end of the split-ring, and at least one sealing ring between said spacer ring and end bushing.

5. A coupling according to claim 4, wherein said sleeve is formed with an internal shoulder between its threaded and conical ends, which shoulder is adapted to engage said end bushing to facilitate the insertion of the pipe into the housing bore by the sleeve without the split-ring.

* * * * *